United States Patent

McVoy

[15] 3,684,823

[45] Aug. 15, 1972

[54] TELEVISION COMMUNICATIONS SYSTEM

[72] Inventor: David S. McVoy, Gainesville, Fla.

[73] Assignee: Coaxial Scientific Corporation, Alachua, Fla.

[22] Filed: Dec. 9, 1970

[21] Appl. No.: 96,456

[52] U.S. Cl. ....................................178/5.1, 325/392

[51] Int. Cl. ................................................H04n 1/44

[58] Field of Search ..........178/5.1; 325/392; 178/5.6

[56] References Cited

UNITED STATES PATENTS

| | | | |
|---|---|---|---|
| 3,438,037 | 4/1969 | Leland | 325/392 |
| 2,923,862 | 2/1960 | Teich | 325/392 |
| 2,367,327 | 1/1945 | Beers | 325/392 |

*Primary Examiner*—Benjamin A. Borchelt
*Assistant Examiner*—S. C. Buczinski
*Attorney*—Olson, Trexler, Wolters & Bushnell

[57] ABSTRACT

A cable television communications system has signal processing headend equipment that emits a low frequency control signal that modulates the audio carrier. The control signal is transmitted over the cable along with the video and audio information. The control signal actuates control circuitry in a receiver. In the absence of the control signal the receiver will be disabled by reason of a disabling signal being applied to a critical circuit of the receiver. When the control signal is received, however, the disabling signal is removed and the receiver operates normally. For subscription television programs, another low frequency audio control signal may be sent over the cable to actuate another control circuit and jam a channel with another disabling signal. The second disabling signal may be manually switched out by a subscriber who at the same time activates a timing device to record the subscription viewing time.

16 Claims, 10 Drawing Figures

Inventor
David S. McVoy
By: Olson, Trexler, Wolters & Bushnell attys

Inventor
David S. McVoy
By: Olson, Trexler, Wolters & Bushnell attys.

Inventor
David S. McVoy
By: Olson, Trexler, Wolters & Bushnell attys.

TELEVISION COMMUNICATIONS SYSTEM

BACKGROUND OF THE INVENTION

This invention relates to a television system that precludes normal video or audio reproduction unless a control signal is present.

With the continued expansion of cable television systems, it is contemplated that cable system operators may lease or arrange for leasing of black and white or color receivers for use by subscribers in homes or institutions. In particular the practice of leasing of color receivers may come about largely because of the high cost of such receivers. Such receivers might economically be leased at a modest periodic rental to those who cannot otherwise afford them. However, such receivers are subject to theft despite the usual precautions taken to avoid such acts.

A further activity contemplated by cable television system operators (and possibly broadcasters themselves) is subscription television or so called "pay TV". Subscription television systems are known, but most involve the use of expensive decoders that are added to existing sets. Furthermore, even with simplified decoders, subscribers may wish to lease receivers equipped for pay TV rather than have their sets converted for that purpose.

OBJECTS AND SUMMARY OF THE INVENTION

An object of this invention is to provide an arrangement which discourages theft of leased receivers intended to be connected to a cable system.

A further object of this invention is to provide a modification of a conventional television receiver such that it is rendered useable only when receiving signals from a cable headend or broadcast transmitter that is transmitting a particular activating or control signal for the receiver.

Another object of this invention is to provide an arrangement of the type stated which is relatively inexpensive to embody into a receiver and into headend equipment of a cable system.

A still further object of this invention is to provide an arrangement of the type stated which does not interfere with the operation of unmodified receivers connected to or used apart from the cable.

Yet another object of this invention is to provide an arrangement in a receiver for detecting the presence of a transmitted control signal whereby detection of the control signal may be used to permit normal video and/or audio reception for subscription television. In the absence of the control signal the sound and/or picture is unuseable because a vital circuit is disabled. However, at the option of the subscriber, the control signal may be applied through control circuitry to render the vital circuit normally operable, and thereby cause a normal picture and/or sound signal to reach the picture tube and/or loudspeaker of the receiver. At the same time a billing recorder for the pay TV time can be actuated. The pay TV control signal may be the only control signal transmitted for the receiver, or the pay TV signal may be a signal that is transmitted in addition to the previously mentioned activating or control signal. Thus, two control signals may be transmitted, one for controlling the normal operation of the receiver generally, and the other for controlling the operation of each channel of the receiver for pay TV.

The present invention contemplates incorporating into the headend equipment of a cable system means for generating a control signal of known frequency for transmission over the cable. This frequency is one that does not interfere with other cable transmissions. It may be a low frequency tone (e. g., 20 cycles) on the audio carrier. The receiver includes a control circuit for detecting the control signal and utilizing that signal to effect the normal operation of any critical circuit or circuits of the receiver and thereby render normal the operation of the cathode ray tube or the loudspeaker, or both. Such critical circuit may include the cathode circuit of the CRT, the I. F. circuits, a stage of audio amplification, the video amplifier, to name but a few. If, however, in operation of the receiver, the control signal is not detected, the critical circuit or circuits are disabled rendering the receiver unuseable. Thus, a person who uses the receiver to receive signals from a cable that is sending out the control signal has a normally operating receiver. However, an unauthorized use of the receiver, such as for over the air reception, results in an unuseable receiver because no control signal is being received.

Figures 1, 2, 7, 8:
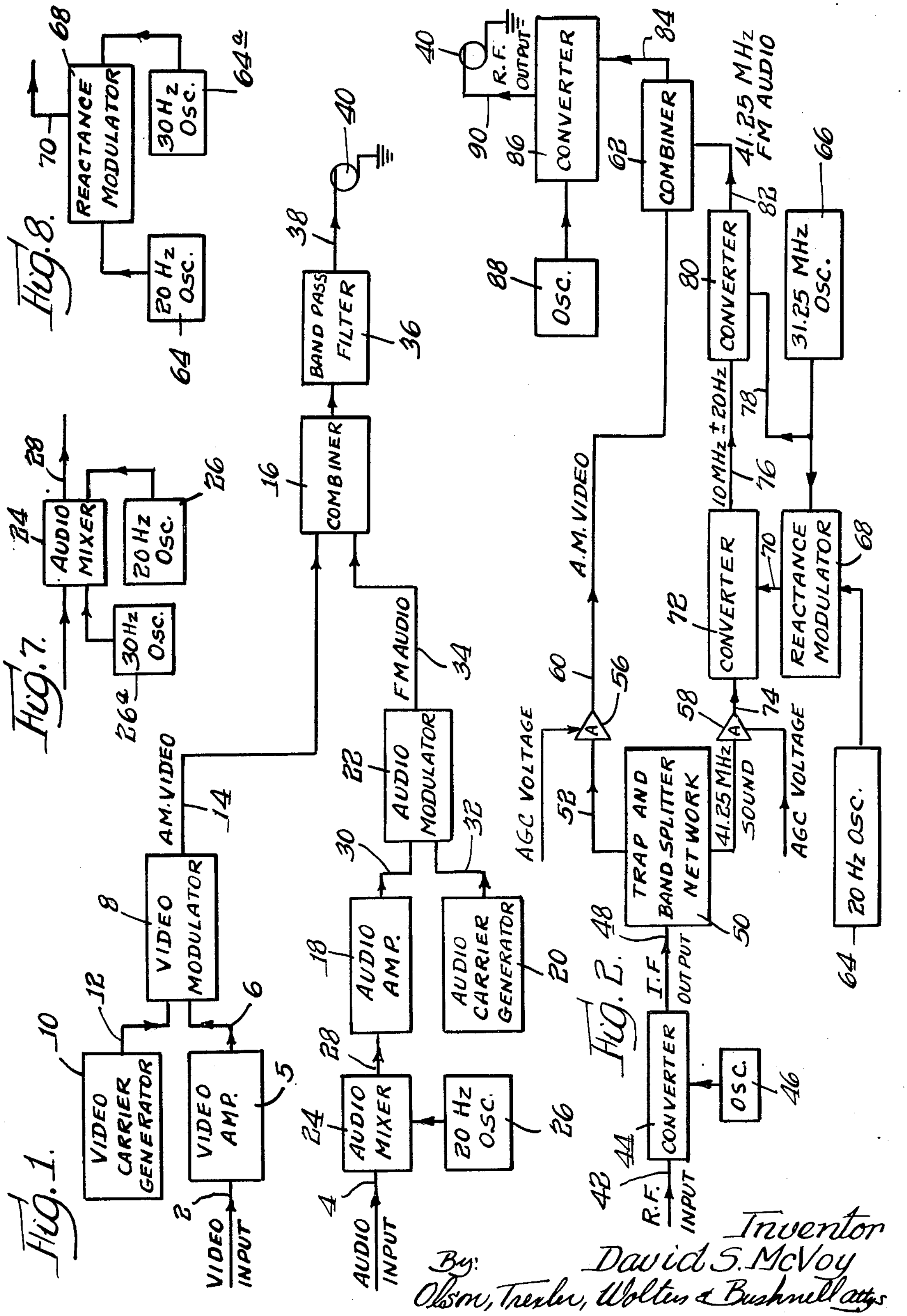
FIG. 1 is a block diagram of a demodulation-remodulation headend signal processer which forms part of the present invention.
FIG. 2 is a block diagram of a heterodyne headend signal processer which forms part of the present invention.
FIGS. 7 and 8 are abbreviated diagrams of a modified form of cable headend processers for use with subscription television.

Referring now in more detail to the drawing, and in particular to FIG. 1, the demodulation-remodulation processer for the cable headend receives video and audio input signals on conductors 2, 4 for insertion into the processer. These video and audio signals may be the video and audio signals received from the master antenna of the system or from another coaxial cable and which have been demodulated so as to insure that only the desired carrier frequencies will be introduced into the cable system. The audio and video signals may also be program-originating signals from the cable system headend. The video input on conductor 2 is sent to a video amplifier 5 the output from which is on conductor 6 and is sent to a video modulator 8. A video carrier generator 10 of desired frequency is sent over conductor 12 to the video modulator 8 whereby the video information is suitably modulated on the desired carrier. The output from the video modulator 8 on conductor 14 constitutes the amplitude modulated video signal which is sent to a conventional coupler or combiner 16.

In the conventional processer the audio input on conductor 4 is sent to an audio amplifier 18 where the output thereof and the output of the audio sub-carrier generator 20 are sent to an audio modulator 22 for producing the frequency-modulated audio signal to be transmitted over the cable. However, in the present invention the audio input on conductor 4 is sent to an audio mixer 24 which also receives a signal from an oscillator 26. In the form of the invention herein described the oscillator 26 generates a 20Hz tone. Thus, the output on conductor 28 consists of the mixed audio input and the 20Hz audio tone. As will be seen hereafter, the 20Hz tone serves as a control signal for effecting proper operation of the television receiver of the present invention. The signals on conductors 30, 32 represent respectively the outputs of the audio amplifier 18 and audio carrier generator 20 and are sent into the audio modulator 22 with the result that the modulator 22 sends an output signal on conductor 34 that represents the frequency modulated audio information plus the control tone. The amplitude modulated video and the frequency modulated audio are combined in the combiner 16 and then sent to a bandpass filter 36 which limits the output frequency therefrom on conductor 38 to the desired bandwidth of the carrier to be transmitted over the coaxial cable 40.

FIG. 2 shows a heterodyne processer which may be used in lieu of the demodulation-remodulation processer of FIG. 1. In the arrangement of FIG. 2, the RF input on conductor 42 is received from the output of a tuned circuit that receives its signal, for example, from the master antenna of the system. This RF input on conductor 42 is a selected channel frequency for a particular television channel to be transmitted over the cable 40. The RF signal is "down" converted by a converter 44 that operates in conjunction with a local oscillator 46. The down conversion of frequency is such as to provide an output on conductor 48 corresponding to the standard television intermediate frequency. This intermediate frequency (IF) is, of course, of the same bandwidth as that of the normal television channel (6MHz). The IF output on conductor 48 is sent to a trap and bandsplitter network 50 to provide two outputs, one on conductor 52 representing the 45.75MHz IF video output and the other on conductor 54 representing the 41.25MHz audio IF signal. These separated signals are sent to respective amplifiers 56, 58. As shown in FIG. 2 AGC voltages may be applied to the respective amplifiers 56, 58 to insure uniform outputs therefrom. The output from amplifier 56 proceeds on conductor 60 to a combiner 62.

To introduce the control signal into the audio system there is provided a 20Hz oscillator 64 and a crystal-controlled, 31.25MHz oscillator 66 both of which feed into a reactance modulator 68 to produce a frequency modulated output on conductor 70 for transmission to a converter 72. Since the output from the amplifier 58 on the conductor 74 is at a frequency of 41.25MHz and since the output on conductor 70 is of a frequency of 31.25MHz ± 20Hz the output from converter 72 on conductor 76 will be 10MHz ± 20Hz. The output from the oscillator 66 also proceeds over conductor 78 to an "up" converter 80. The output from converter 80 on conductor 82 will therefore be the sum of 31.25MHz and 10MHz ± 20Hz or, in other words, 41.25MHz. In this regard it should be noted that in the converter 72 there may be a suitable bandpass filter which eliminates the "sum" signal on conductors 70, 74, and by the same token the converter 80 may incorporate a suitable bandpass filter to eliminate the "difference" signal from conductors 76, 78. The outputs on conductors 60, 82 are sent to a conventional combiner 62 and from there over conductor 84 to an "up" converter 86. The "up" converter 86 operates in conjunction with an oscillator 88 whereby the output of the converter 86 on conductor 90 constitutes the RF of the desired television channel for transmission over the cable 40.

Figures 3, 4, 6:
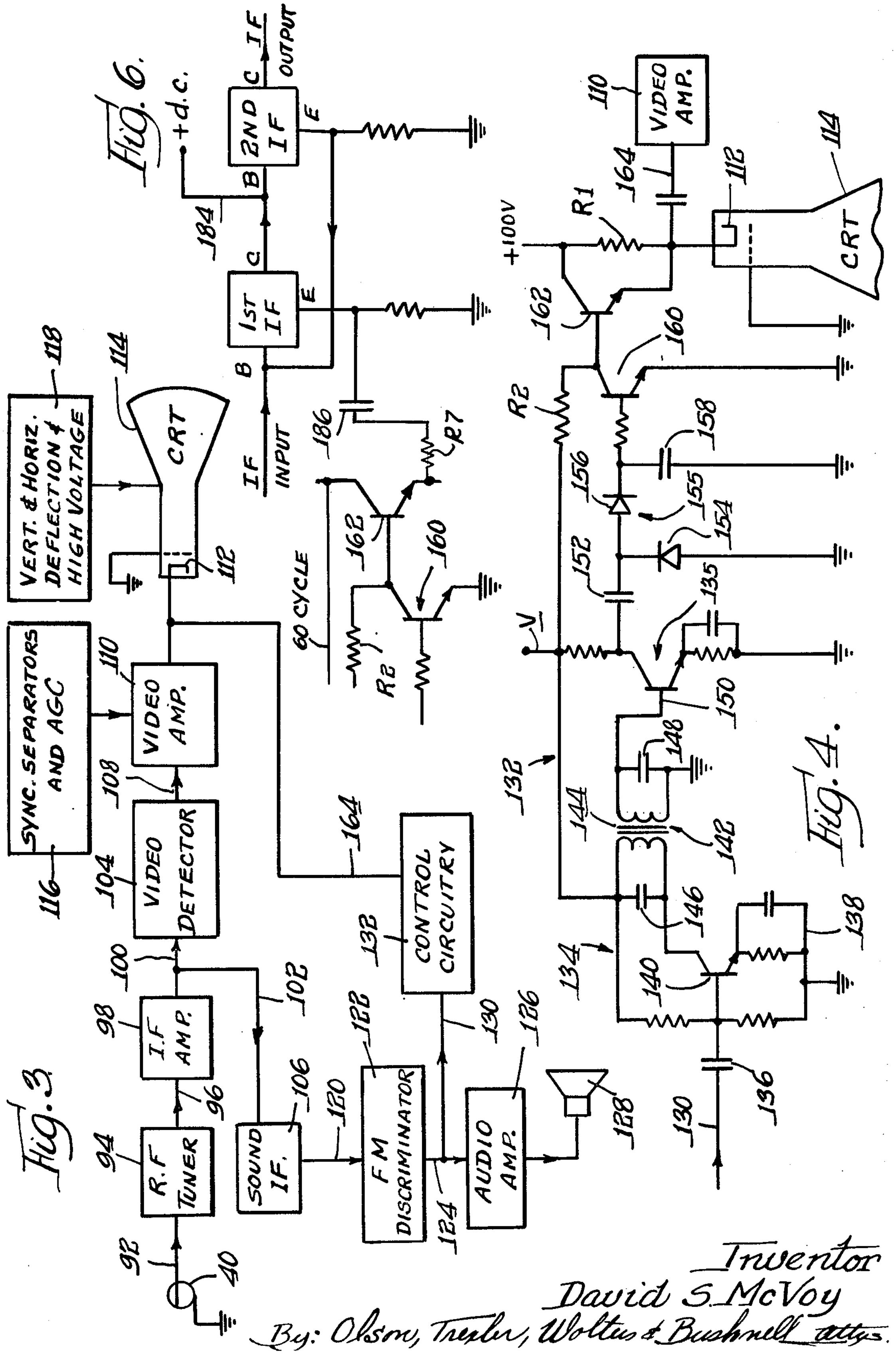
FIG. 3 is an abbreviated block diagram of a television receiver embodying the present invention.
FIG. 4 is a schematic of the control circuitry of the present invention.
FIG. 6 is a schematic of a further form of the invention.

Referring now to FIG. 3 it will be seen that the modulated RF signal containing the video information, the audio information and the 20 cycle control signal are sent over a tapoff or drop 92 to the RF tuner 94 of the receiver. At this time it should be noted that while the present invention is particularly suitable for cable transmission, the transmitted RF may be via a broadcast antenna. In such instance the input to the RF tuner 94 may be the output of the antenna of the receiver.

The output of the RF tuner is sent over conductor 96 to the IF amplifier or amplifiers 98 and from there over conductors 100, 102 to the video detector 104 and I.F. amplifier 106. Also, the output of the video detector 104 is sent over conductor 108 to video amplifier 110 where the output therefrom is applied to the cathode 112 of the cathode ray tube (CRT) 114. The operation of the CRT 114 is also conventionally controlled by sync separators and AGC circuits 116 as well as the usual deflection and high voltage circuits 118. The output from the I.F. amplifier 106 is sent over conductor 120 to an FM discriminator 122 and from there over conductor 124 to audio amplifier 126 the output of which drives a loudspeaker 128. The output from the FM discriminator 122 is also sent over conductor 130 to control circuitry 132 of the type shown more fully in FIG. 4 and presently to be more fully described. As shown herein, the output signal from the control circuitry 132 is connected to the cathode 112 of the CRT 114.

Referring now to FIG. 4 it will be seen that the demodulated audio signals are sent to an amplifier circuit 134 through coupling capacitor 136. The amplifier 134 is of usual form and includes a biasing network 138 for the emitter of the transistor 140. The output of the amplifier 134 is connected to a tuning circuit 142 having a conventional tuning coil 144 and capacitors 146, 148. The tuning circuit 142 has a resonant frequency corresponding to the frequency of the control signal, in this instance 20 cycles. Thus, the output on conductor 150 will have substantially a frequency of 20 cycles if the audio is impressed on conductor 130. If necessary, an additional amplifier 135 receives the output on conductor 150 for further signal gain. The output of the amplifier 135 is coupled through capacitance 152 to a rectifier in the form of detector/voltage doubler network 155 containing diodes 154, 156. The d.c. output from this network may be filtered by filter capacitor 158 and thereafter sent to a transistorized inverter 160. The power supply for the transistors of the amplifiers 134 and 135 and for the inverter 160 may be a suitable d.c. source V which may be tapped from the rectified low voltage power supply of the receiver. The inverter 160 is adapted to actuate a switching transistor 162 that serves to permit the normal operation of the receiver upon an input as conductor 130 of the 20 cycle control signal. The proper bias on the base of the transistor 162 may be determined by the resistor R2.

In the embodiment of FIGS. 3 and 4, the switching transistor 162 is used to control the application of a disabling signal to the CRT 114. This disabling signal may be a voltage that blacks out the CRT 114. For this purpose a suitable positive voltage is applied at the collector of the switching transistor 162. This positive voltage may, for example, be 100 volts, as indicated in FIG. 4. Furthermore, in a typical receiver zero voltage on the cathode 112 would result in the picture intensity of fully white whereas +100 volts on the cathode 112 would result in the screen CRT 114 being fully black. If no 20 cycle tone is sent through the control circuit 132 (meaning no such tone is being received) then the switching transistor 162 is in the "on" or conducting condition due to the applied bias on its base. In such instance the resistor R1, between the cathode 112 and the +100 volt source, is effectively short-circuited to raise the voltage at the cathode 112 to +100 volts regardless of the video signal. On the other hand if the 20 cycle control signal is being transmitted and, therefore, detected by the control circuitry 132, a signal will appear at the output of the inverter 160. The bias on the base of the switching transistor 162 is made negative by an amount sufficient to cause the transistor 162 to cease conducting so that the +100 volts are applied across the resistor R1. The value of R1 is sufficiently high that the voltage thereacross does not affect the normal operation of the CRT 114 and so the video output signal on 164 controls the cathode 112 in the normal manner.

The control signal need not, of course, be precisely 20 cycles, and if another frequency is used the tuning circuit 142 will have appropriate parameters. Frequencies of the order of 20 to 30 cycles per second are particularly suitable because in practically all television receivers such frequency is below the frequency response of the loudspeaker or loudspeakers of most receivers. Moreover, even in receivers having very high fidelity audio systems, there may be included in the audio amplifier a 20 to 30 cycle filter, or such a filter could be added.

While in FIGS. 3 and 4 the circuitry 132 is used to control the application of a disabling signal to the CRT 114, it will be apparent that the output from the control circuitry may be used to control the operation of various other circuits in the receiver, for example, sweep circuits, last audio stage, video amplifier, etc. This may be done in various ways analogous to what has been shown and described. For example, an appropriate tube or solid state component in a critical circuit may, through the control circuitry 132, be incorrectly biased or have disabling voltages applied thereto which, in the absence of the control signal, results in a distortion of the video and/or audio to the point of uselessness. However, when the control signal appears, the improper bias, false voltage, or signal as the case may be, is removed leaving the voltages or other conditions in the critical circuit normal.

Figure 5:
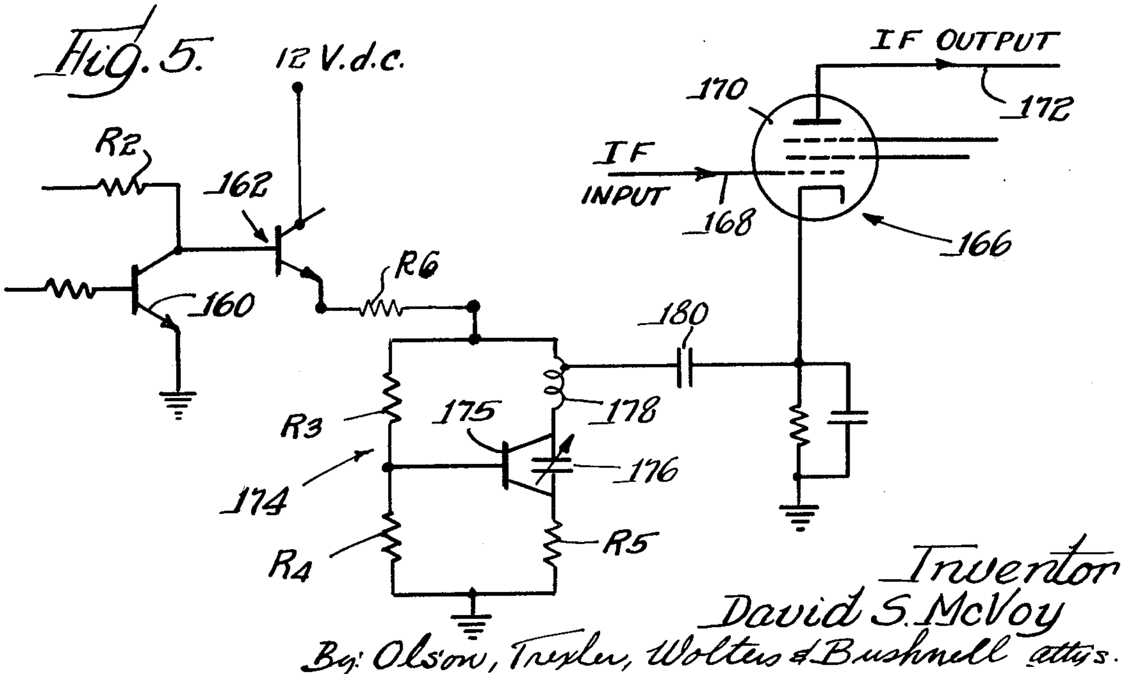
FIG. 5 is a schematic of a modified form of the invention.

A further form of the invention is shown in FIG. 5 wherein the disabling signal is applied to a stage in the IF portion of the receiver under control of the control circuitry 132. An abbreviated diagram of a typical first stage of IF amplification for the receiver is shown at 166. Conventionally, the IF input signal on conductor 168 to the grid of the tube 170 is amplified and sent out over the output conductor 172 in the plate circuit of the tube. For simplicity, various other and conventional portions of the IF amplification circuit are not shown. A transistorized oscillator 174 is used to provide the disabling signal. The oscillator is tuned to some frequency within the video IF passband (41.55MHz to 45.75MHz). A suitable oscillator frequency is 44.0MHz. The oscillator 174 includes transistor 175, resistors R3, R4, R5, tuning capacitor 176 and coil 178. These components are connected together in a known configuration, as shown in FIG. 5. The output of the oscillator 174 is applied through capacitor 180 to the cathode of the tube 170. Power is supplied to the oscillator 174 from the positive source (e. g., +12 volts) through resistor R6. If no 20 cycle control signal is received, there will be no output from the inverter 160 and the switching transistor 162 will be conducting. Thus, the oscillator will receive applied voltage from its power supply. The inserted signal into the IF amplifier circuit 166 from the output of the oscillator 174 results in the creation of an extremely strong beat interference being sent to the CRT 114. This results in highly objectionable wiggly lines such that the picture is rendered unuseable. However, if the 20 cycle control signal is received, the output from the inverter 160 will cause the switching transistor 162 to cease conducting. Then there is no output from the oscillator 174 and the receiver operates normally.

A further form of control arrangement for a disabling signal is shown in FIG. 6. In this form of the invention two stages of IF amplification are shown in abbreviated block diagram form. Assuming, by way of example, solid state components, the base emitter and collector locations for the two stages are shown in FIG. 6 as B, C, E. Automatic gain control voltage is supplied at 184 to the base of the second IF amplifier to control its relative gain. Conventionally, the d.c. voltage at the emitter of the second IF amplifier is fed back to the base of the first IF amplifier as a gain control.

A 60 cycle a.c. source is connected through resistor R7 and capacitor 186 to the emitter of the first IF amplifier. Where vacuum tubes are used, this connection would go to the cathode of the tube. In a typical arrangement where a vacuum tube (such as a type 3KT6) is used 6 volts a.c. may be applied to the cathode. If no 20 cycle control signal is received there will be no output on the inverter 160 and the switching transistor 162 will be conducting. The 60 cycle wave is then applied to the first IF as a disabling signal. Since the cathode or emitter, as the case may be, of the IF amplifier is normally only d.c. biased, the effect of the applied a.c. signals will be to amplitude modulate the amplifier with 60 cycles. Consequently, there will be a strong amplitude modulation of the AM video IF signal as well as an amplitude modulation of the FM sound IF signal. The picture on the CRT 114 will, therefore, be severely modulated with a 60 cycle hum and will be unuseable. It should be noted that the time constant in the automatic gain control circuit is of the order of five seconds and as a result the AGC arrangement will be unable to respond to the 60 cycle signal. When the 20 cycle control signal is received causing an output on the inverter 160 the switching transistor 162 becomes non-conducting, resulting in normal operation of the receiver.

FIGS. 7–10 show an arrangement for selectively controlling the operation of a receiver for reception of subscription television from the headend of the cable. For this purpose the headend of the cable may optionally generate for each channel, in addition to the 20 cycle tone, an additional control or jamming signal which may, for example, be 30 cycles per second. Such tone may be of the order of 20 to 30 cycles per second but should not be too close to the frequency of the earlier discussed control signal. This may be easily done in the processer of FIG. 1 as shown in FIG. 7 by providing a 30 cycle oscillator 26*a* the output of which is fed into the audio mixer 24. Similarly, as shown in FIG. 8, the processer of FIG. 2 may have a 30 cycle oscillator 64*a* with its output fed in to the reactance modulator 68.

Figures 9, 10:
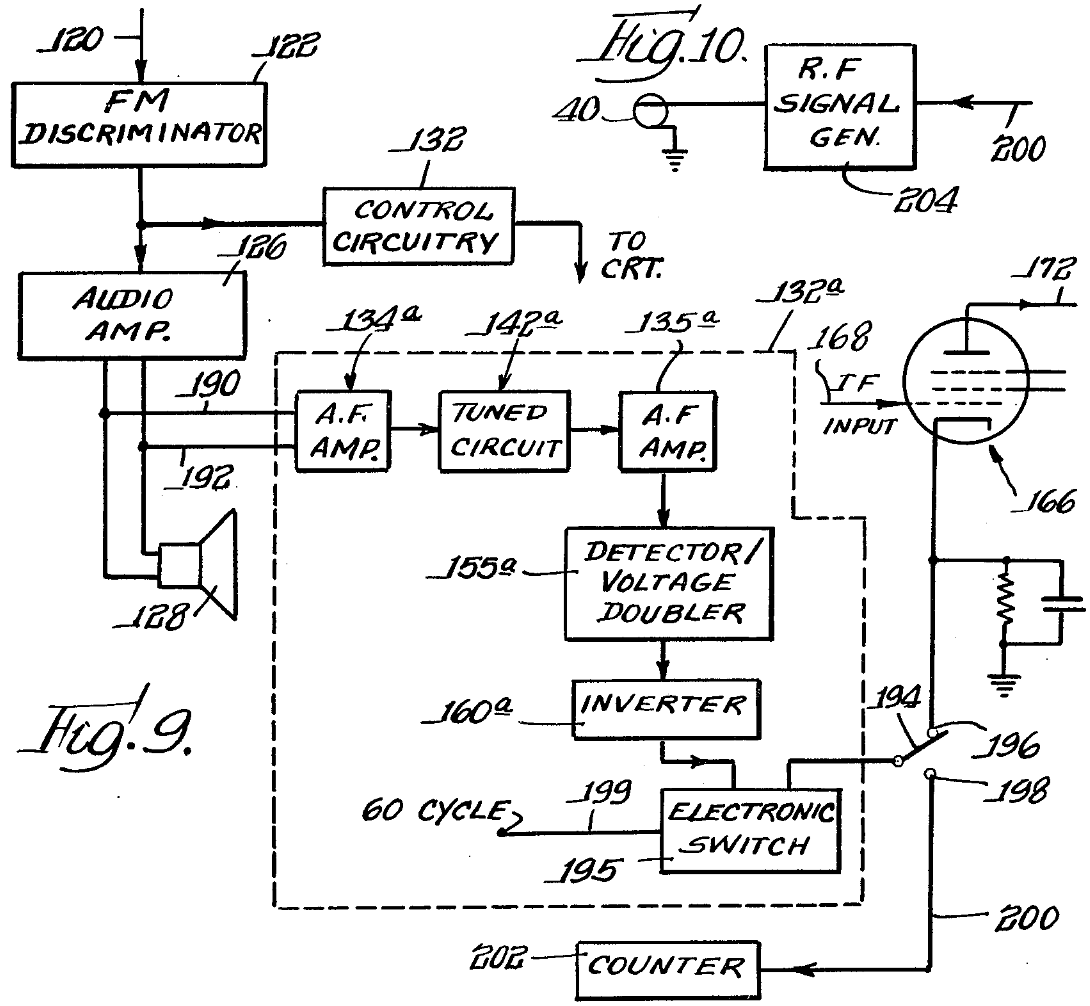
FIG. 9 is a modified form of receiver for use with a subscription television arrangement.
FIG. 10 is a modified form of the arrangement of FIG. 9.

Referring to FIG. 9, the 30 cycle pay TV control signal will pass through the receiver and will appear at the leads of the loudspeaker 128. Thus, conductors 190, 192 may be tapped from the speaker leads and fed into control circuitry 132*a*. This includes audio frequency amplifier 134*a*, tuned circuit 142*a* and audio frequency amplifier 135*a*. The output from the amplifier 135*a* is sent to the detector/voltage doubler 155*a* and then to the inverter 160*a* and finally to an electronic switch 195. In this regard it should be noted that the circuits 134*a*, 135*a*, 155*a* and 160*a* are similar to the corresponding elements lacking *a*, previously described. However, the circuit 142*a* differs from the circuit 142 in that the circuit 142*a* is tuned for 30 cycles per second. When the 30 cycle tone passes through the control circuitry 132*a* of FIG. 7, thus closing the normally open electronic switch 195, a low voltage 60 cycle signal (continuously applied on conductor 199) will appear at the manually operable switch arm 194 and serve as a disabling signal. If the switch arm 194 engages a switch contact 196 the 60 cycle disabling tone will be applied to the IF amplifier circuit 166 resulting in a strong beat interference being sent to the cathode ray tube 114 and a visual effect created similar to that with respect to the arrangement referred to with respect to FIG. 6. In this condition it will not be possible satisfactorily to view subscription television sent over the cable 40 on the particular channel on which the 30 cycle tone appears. However, if the subscriber wishes to view subscription television, it is merely necessary to move the manually operable switch arm or contact 194 so as to engage the switch contact 198. This removes the 60 cycle tone from the IF amplifier 166. In this regard it should be noted that it is assumed that the 20 cycle tone is also being received and handled through the control circuitry 132 so that the cathode ray tube is otherwise normally operable.

With the switch elements 194, 198 in contact the 30 cycle tone will be sent over conductor 200 to a suitable counter 202. This counter 202 may be of any known type such as an "event" counter or an elapsed time clock so as to record the length of time that the subscriber is using the receiver to receive subscription television. The counter 202 may be housed in or adjacent to the receiver and contain a meter that may be periodically read in order to ascertain subscription charges.

Since each channel is processed separately at the headend of the cable system the 30 cycle tone can be selectively applied to anyone or more of the channels used.

FIG. 10 shows a modified arrangement for counting or ascertaining subscription television charges. The 30 cycle signal on conductor 200 serves to actuate a radio frequency signal generator 204 that transmits signals back over the cable 40 to the headend for billing processing. The frequency transmitted by the signal generator 204 may, if desired, be unique for each subscriber so that monitoring of the subscription time for each subscriber may be readily determined by the frequency of the pulses received and the length of time the pulses appear. Such an arrangement also provides a means by which subscribers could be charged different rates for different programs. To accomplish this it is merely necessary to send 30 cycle tones in groups or pulses, whereby the rate of transmission of each group of 30 cycle pulses would be determinative of the billing charges. The various billing pulses can be processed by a computer programmed to handle the data so as to prepare bills to subscribers.

In each of the embodiments of the invention the d.c. or a.c. disabling signal, or the supply voltage for an oscillator as in FIG. 5, is available by appropriate tapoff from the low voltage power supply of the receiver.

The invention is claimed as follows:

1. A television communications system having a coaxial cable, signal processing means connected to the cable for sending to the cable for transmission thereover radio frequency signals including amplitude modulated video signals and frequency modulated audio signals, said signal processing means including means for introducing a control signal to the cable for transmission with said signals; a receiver connected to said cable for receiving said transmitted audio, video, and control signals, said receiver having a cathode ray tube, loudspeaker means, and circuit means for normally operating the cathode ray tube to produce an image in accordance with the video information of said video signals and for normally operating said loudspeaker means in accordance with the audio information of said audio signals; said receiver also including control circuitry with an input for receiving said control signal and means for detecting the presence of said control signal, said control circuitry further having an output condition which provides control means upon detection of the control signal by said detecting means, said receiver having means for supplying a disabling signal, said control means being operable to apply selectively the disabling signal to said circuit means such that the presence of said output condition results in one characteristic operation of said circuit means and the absence of said output condition results in another characteristic operation of said circuit means, one of the two characteristic operations being the normal operation of said circuit means and the other of said characteristic operations being an effective disabling of said circuit means.

2. A system according to claim 1 in which the control signal frequency modulates the RF carrier for said audio signals.

3. A system according to claim 2 in which the control signal is of a frequency substantially no greater than the low-end frequency response of the loudspeaker means.

4. A system according to claim 1 in which the means for introducing the control signal to the cable comprises means for generating said control signal, means for generating an RF signal, means for frequency modulating said RF signal with said control signal to produce a first frequency modulated output, means for heterodyning said first output with a frequency modulated audio information signal to provide a second frequency modulated output, and means for heterodyning said second output with said RF signal to produce a third frequency modulated output which is of the same RF as said frequency modulated audio information signal and contains said information and said control signal.

5. A system according to claim 2 in which the presence of said output condition results in the normal operation of said circuit means and the absence of said output signal prevents the normal operation of said circuit means.

6. A system according to claim 2 in which the presence of said output signal is adapted to disable the normal operation of said circuit means, and manually controlled means for removing said output from said circuit means, and means operable upon operation of said manually controlled means for effecting a time measure of the operation of the receiver.

7. A system according to claim 1 including an additional control signal, additional control circuitry providing additional control means upon detection of said additional control signal, the control signals frequency modulating the RF carrier for the audio signals, and means supplying a second disabling signal to said circuit means under control of said additional circuitry.

8. A television receiver having circuit means for receiving a modulated video carrier and a modulated audio carrier; said circuit means including means for demodulating the video carrier to produce a video information signal, means for demodulating the audio carrier to produce an audio information signal, a cathode ray tube, loudspeaker means, circuitry forming part of said circuit means for operating said cathode ray tube to produce an image in accordance with said demodulated video signal and for operating said loudspeaker means in accordance with said demodulated audio signal, means for supplying a disabling signal, and control circuitry for selectively applying the disabling signal to said circuit means except upon reception by the receiver and detection by said control circuitry of a control signal of substantially a predetermined characteristic.

9. A television receiver according to claim 8 in which said control circuitry includes an input for receiving said demodulated audio signals and said control signal and means for detecting the presence of said control signal.

10. A television receiver according to claim 9 including switching means operated by said control circuitry for removing the disabling signal from said circuit means upon receipt of said control signal by said control circuitry.

11. A television receiver according to claim 9 in which said control circuitry applies the disabling signal to a part of said circuit means that contains demodulated signals.

12. A television receiver according to claim 9 in which said control circuitry applies the disabling signal to a part of said circuit means that contains modulated RF signals.

13. A television receiver according to claim 9 in which said control circuitry includes a circuit tuned for a frequency of the control signal that is of the order of twenty to thirty cycles per second.

14. A television receiver having circuit means for receiving a modulated video carrier and a modulated audio carrier; said circuit means including means for demodulating the video carrier to produce a video information signal, means for demodulating the audio carrier to produce an audio information signal, a cathode ray tube, loudspeaker means, circuitry forming part of said circuit means for operating said cathode ray tube to produce an image in accordance with said demodulated video signal and for operating said loudspeaker means in accordance with said demodulated audio signal, means for supplying a disabling signal, control circuitry for receiving a demodulated audio signal and operable to apply said disabling signal to said circuit means upon reception of said control signal by said control circuitry, selector means for removing the disabling signal from said circuit means notwithstanding reception of said control signal by said control circuitry, and means operable upon removal of said disabling signal for effecting a time measure for the operation of the receiver.

15. A receiver according to claim 14 in which said control circuitry includes a circuit tuned for the frequency of said control signal that is of the order of 20 to 30 cycles per second.

16. A communications system having a coaxial cable, signal processing means connected to the cable for sending to the cable for transmission thereover radio frequency signals including modulated information signals, said signal processing means including means for introducing a control signal to the cable for transmission with said signals; a communications receiver connected to said cable for receiving said transmitted information and control signals, said receiver having a transducer, and circuit means for normally operating the transducer ray tube to produce an output in accordance with the information of said signals; said receiver also including control circuitry with an input for receiving said control signal and means for detecting the presence of said control signal, said control circuitry further having an output condition which provides control means upon detection of the control signal by said detecting means, said receiver having means for supplying a disabling signal, said control means being operable to apply selectively the disabling signal to said circuit means such that the presence of said output condition results in one characteristic operation of said circuit means and the absence of said output condition results in another characteristic operation of said circuit means, one of the two characteristic operations being the normal operation of said circuit means and the other of said characteristic operations being an effective disabling of said circuit means whereby to disable the normal operation of said transducer.

* * * * *